April 21, 1959 P. AMERIO ET AL 2,882,697
AUTOMATIC PLATE FREEZER FOR CONTINUOUS
FREEZING OF FOOD PRODUCTS
Filed July 27, 1956 4 Sheets-Sheet 1

INVENTORS.
PASQUALE AMERIO
AUGUST KRAFT
BY
*John P. Chandler*

THEIR ATTORNEY.

April 21, 1959  P. AMERIO ET AL  2,882,697
AUTOMATIC PLATE FREEZER FOR CONTINUOUS
FREEZING OF FOOD PRODUCTS
Filed July 27, 1956  4 Sheets-Sheet 2
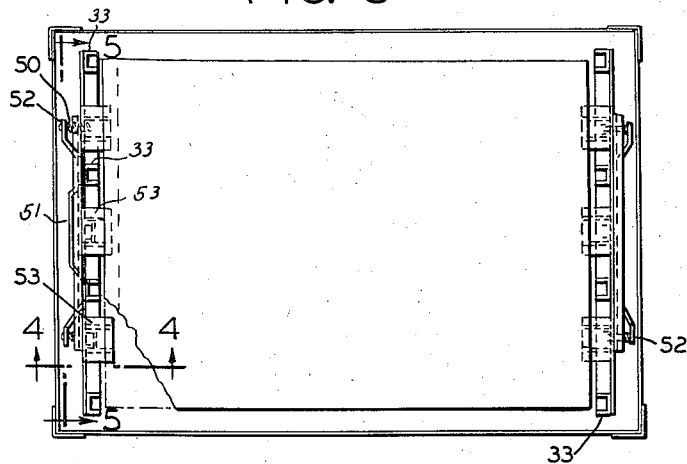
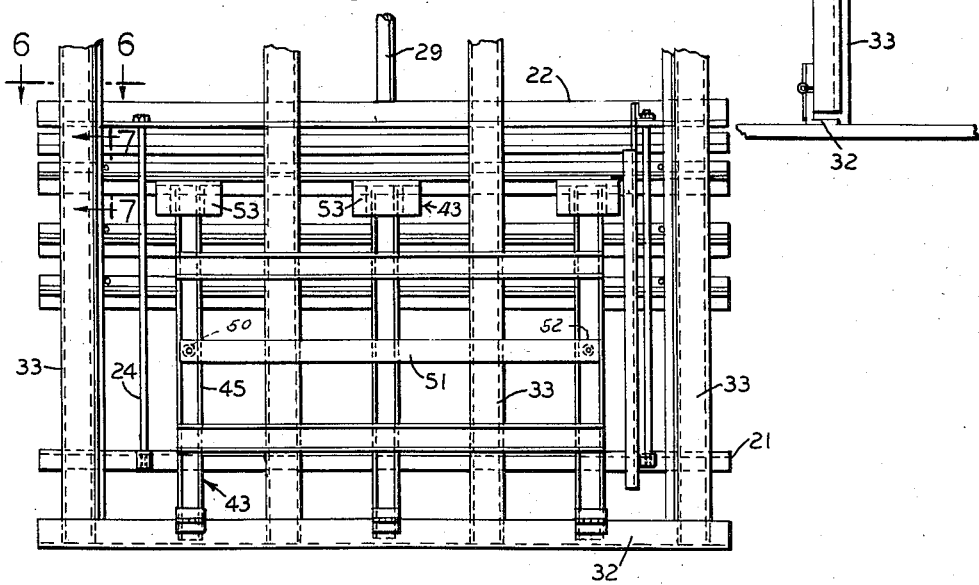
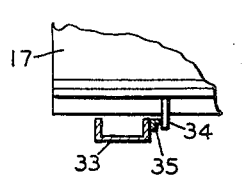
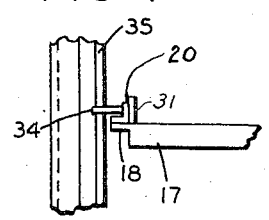
*INVENTORS.*
PASQUALE AMERIO
AUGUST KRAFT
BY
THEIR ATTORNEY.

April 21, 1959

P. AMERIO ET AL 2,882,697

AUTOMATIC PLATE FREEZER FOR CONTINUOUS
FREEZING OF FOOD PRODUCTS

Filed July 27, 1956

INVENTORS.
PASQUALE AMERIO
AUGUST KRAFT
BY
John P. Chandler
THEIR ATTORNEY.

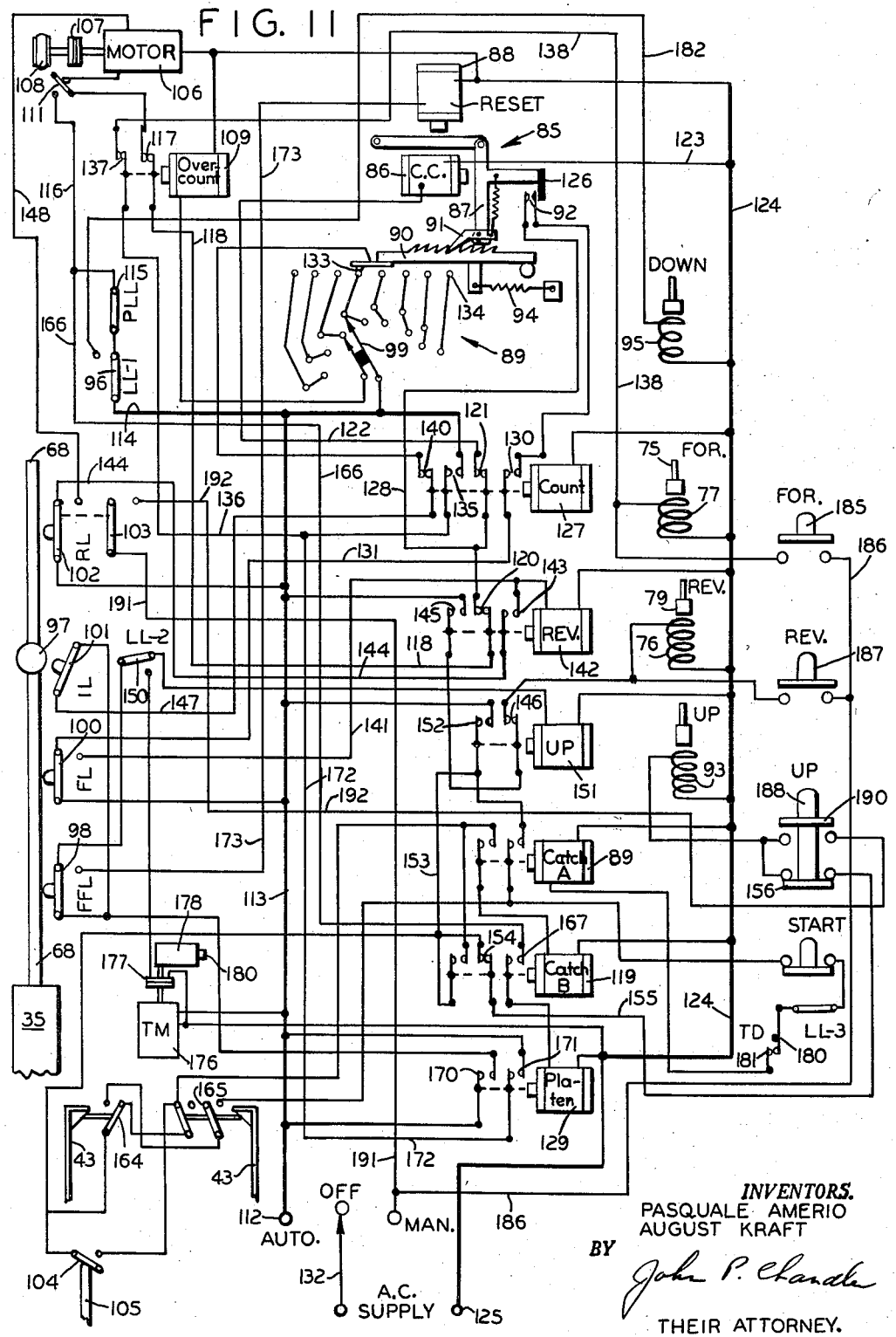

United States Patent Office 2,882,697
Patented Apr. 21, 1959

2,882,697

AUTOMATIC PLATE FREEZER FOR CONTINUOUS FREEZING OF FOOD PRODUCTS

Pasquale Amerio, Erskine Lakes, and August L. Kraft, Roselle Park, N.J., assignors to Amerio Refrigerating Equipment Co., Inc., Union City, N.J., a corporation of New Jersey Application July 27, 1956, Serial No. 600,529

4 Claims. (Cl. 62—158)

This invention relates to commercial freezers and relates more particularly to a novel refrigerating apparatus which may operate as a single unit which is manually or automatically fed or it may form one of a plurality of freezing units in a more comprehensive organization which is fully or partially automatic.

An important object of the present invention is to provide a plate freezer for packages of frozen comestibles wherein the packages are fed to a cavity between two adjacent plates through a single slot-like charging opening in the front wall of the freezer and if packages have earlier been moved into the cavity and have been frozen, the introduction of the unfrozen packages moves the frozen packages out of the cavity through a discharge opening in the rear wall lying on substantially the same plane as the charging opening.

Another object of the invention is to provide a freezer having a plurality of superimposed plates or platens which are mounted on a novel vertically movable cradle or frame which successively positions the cavities between two adjacent platens in the horizontal plane of the charging and discharge openings and at the same time increases the height of the one cavity being loaded so as to permit the boxes to be moved into the cavity without obstruction. The platens are all movable relative to each other and novel means are provided for quickly varying the minimum height of the cavity so as to accommodate boxes of different heights. In other words, if boxes having a height, when filled, of two inches are being frozen, the minimum spacing will be slightly under two inches so as to enable the platens to exert an approved measure of compression thereon during freezing. The height of the cavity is increased to about 2½ inches during charging and if the boxes are placed in trays and the trays introduced in to the cavities the height may be increased to about 2¾ inches.

In its preferred method of operation the uppermost cavity is filled first and the platen array then moved upwardly one increment to allow the second cavity to be filled. This continues until all the cavities are filled. The freezing of the packages commences, however, immediately after the first cavity is filled and continues as the lower cavities are being filled.

The cradle includes a lower frame for supporting all the platens after the cavities have been filled and an upper frame carried at the lower end of a hydraulic ram. The weight of the upper frame and of the platens is generally sufficient to compress the packages but if more pressure is desired the carriage can be lowered to the base wall of the housing and the ram moved downwardly.

It will be apparent from the foregoing that another object of the invention is to provide improved means for temporarily supporting the entire weight of any given platen above the lowermost platen plus the weight of all the platens above this given platen so as to effect the increased spacing during charging. These supporting means also support the entire weight of all of the platens below the given platen.

Automatic pusher means for moving a row of boxes into the cavity form the subject of another application, Serial No. 599,749, now Patent No. 2,812,050.

A further object of the invention is to provide a novel freezer of the character described which can be operated either manually or automatically. In the event that one freezer can service the requirements of a freezing plant the manual control may be resorted to and the operation is somewhat similar to that outlined in MacKenzie Patent No. 2,697,920. For a plant of exceedingly large capacity the automatic operation is preferred and each of the operations are performed in a timed sequence with no loss of effort or time. In the event of the fully automatic operation successive groups of boxes, each containing a predetermined number of boxes, depending upon the length of the platen, are automatically pushed into the cavity, the groups being counted so that when a platen is filled the pusher ceases operation until the platen array is moved upwardly one increment to position a new cavity opposite the charging opening and this operation continues until the freezer is filled. The cradle is now allowed to descend to the floor of the freezer to await completion of the freezing, after which the cycle is repeated.

In the drawings:

Fig. 3 is a section taken on line 3—3 of Fig. 2.

Fig. 4 is a broken section taken on line 4—4 of Fig. 3.

Fig. 5 is a side elevation of the cradle for supporting the freezer platens and the means for separating two adjoining platens, the view being taken on line 5—5 of Fig. 3.

Fig. 6 is a broken section taken on line 6—6 of Fig. 5.

Fig. 7 is a broken section taken on line 7—7 of Fig. 5.

Fig. 11 shows a circuit for controlling operation of the freezer.

Figure 1:
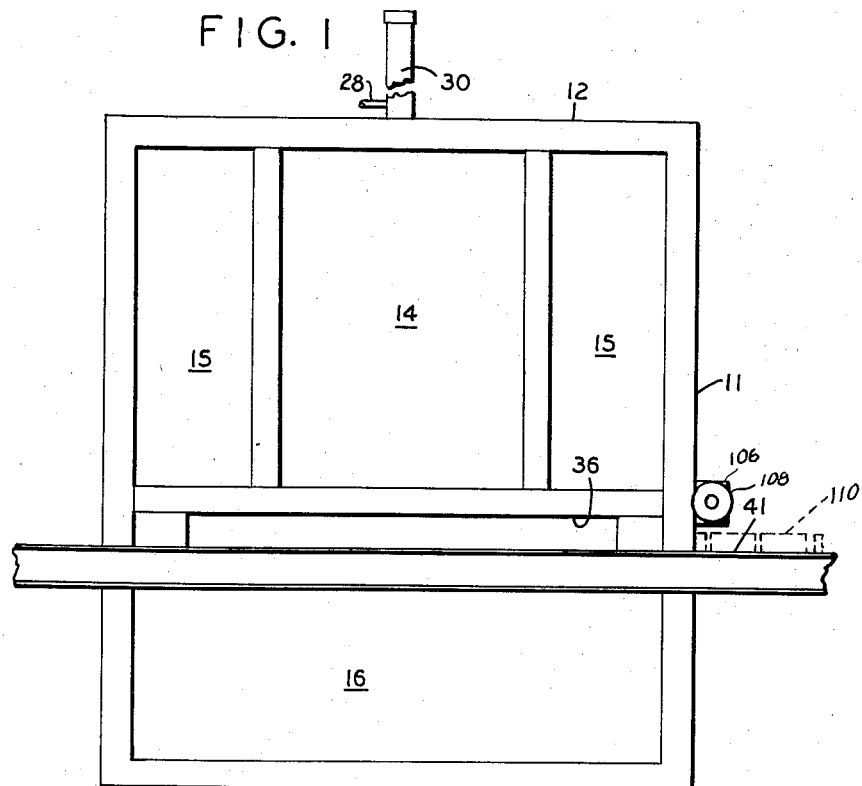
Fig. 1 is a front elevation of a freezer embodying the present invention.
Figure 2:
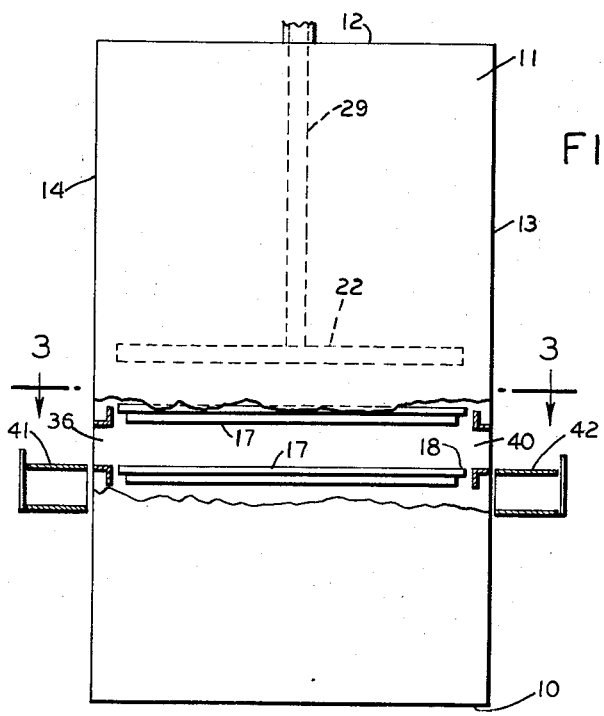
Fig. 2 is a side elevation thereof.

The plate freezer of the present invention is enclosed within an insulated housing having a floor 10, side walls 11, a top wall or roof 12 and a rear wall 13. A front wall 14 may have two upper access panels 15 and a lower access panel 16 which are removable.

The freezer has a plurality of hollow superimposed double contact freezer platens 17 having flanges 18 at their opposed ends and on the upper surface of each end an angle bar 20 is secured as by welding for the purpose of reinforcement. Each platen is connected to extensible supply and discharge headers by means of flexible conduits. These elements have been omitted from the drawing as has the insulation in the housing.

The platens are supported by a vertically movable cradle which includes a lower supporting frame or base 21 and an upper frame 22, both of rugged construction since they support the entire weight of the platens and the packages of food to be frozen during their upward and downward travel. The upper frame has angular extensions 23 and the two frames of the cradle are connected by rods 24 at the corners. At their lower ends the rods are received in lugs 25 and at their upper threaded ends they pass through the angular extensions and have nuts 26 limiting their downward travel. When boxes of lesser depth are to be frozen the distance between the frames is decreased by placing washers or shims under nuts 26.

Figure 8:
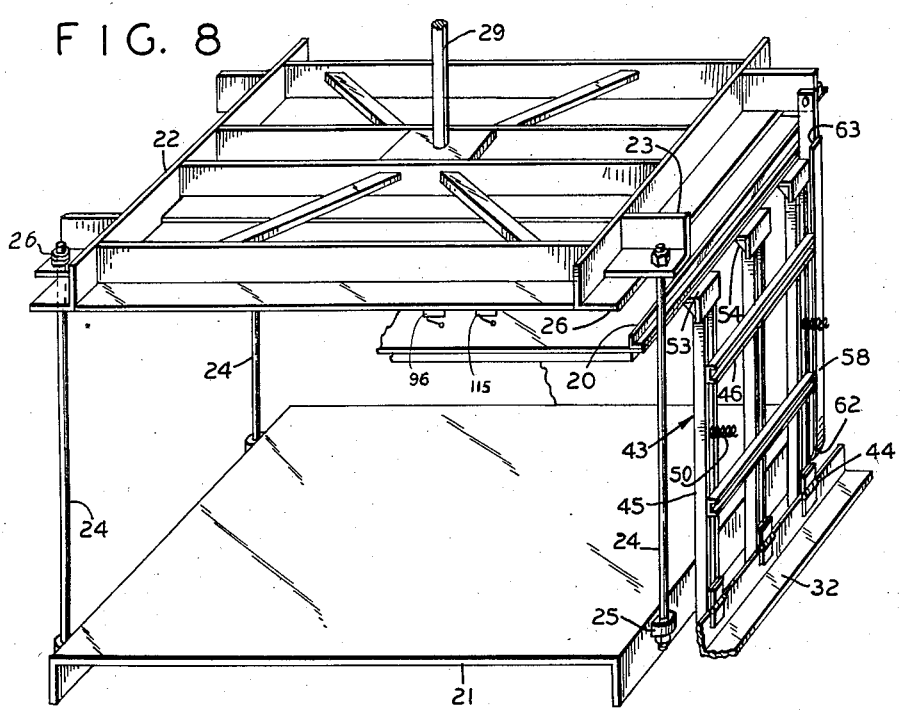
Fig. 8 is a perspective view of the platen supporting cradle or frame.

The entire cradle is supported for up and down movement within the housing by a piston rod 29 secured at its lower end to frame 22 and movable within a cylinder 30 secured to the top wall. A piston (not shown) within the cylinder is actuated by fluid under pressure which enters the cylinder through a conduit 28 connecting with a suitable fluid pump. The lowermost platen rests upon base frame 21 and the platens thereabove are supported on the lowermost platen. The minimum spacing between the platens is generally about 1/16 inch less than the height of the packages which, of course, vary in height as well as in other dimensions. The reason for the lesser spacing than the box height is to enable the platens to exert a measure of compression on the package during freezing. The novel means for effecting this minimum spacing is shown in Figs. 7 and 8 and includes a strip of wood or other material 31 of rectangular cross section resting on the angle bar 20 at each end of the platen. It is not necessary to secure these strips in place since there are no forces tending to dislodge them. Thus when a different box height is employed new strips of appropriate height are substituted.

A substantial rail or angle bar 32 is secured on the housing floor on each side thereof and a plurality of spaced vertical channels 33 are secured at their lower ends to said angles and are secured at the upper ends to the roof of the housing by suitable means. The platens, except for the lowermost, are guided in their vertical travel by means of pins 34 secured to the platens which engage angles 35 secured to channels 33 as shown in Fig. 5.

The front wall 14 of the housing is provided with a narrow slot-like opening 36 through which the packages of unfrozen food are fed to a selected cavity between two adjoining platens. A similar discharge opening 40 is formed in the rear walls on substantially the same plane. The packages may be fed to the cavity by means of a reciprocating pusher, previously referred to, which wipes a column or group of the unfrozen packages from a conveyor 41 and the packages are thus discharged through the rear wall opening onto rear conveyor 42 which moves the packages to a boxing station.

When the cavities between all the platens are filled with boxes for freezing the cradle will normally be lowered to rest on the floor. The weight of the platens and the upper frame is such that no additional pressure is generally required. If, however, additional pressure is required to flatten the contents of the boxes or if the food is of a type which tends to expand considerably during freezing and such expansion must be resisted, this pressure can be supplied by the hydraulic system associated with piston rod 29 and this is done after the freezer has been filled and all the plates are resting on the floor of the freezer.

The platens have their minimum spacing due to strips 31 and for the purpose of increasing the spacing between two plates during charging of the platen area, a pair of catch arms or plate supporting frames 43 are hinged at 44 on angles 32. Each frame comprises a plurality of vertical channels 45 connected by horizontal channels 46. The frame is urged inwardly to platen-supporting position by springs 50 positioned between a horizontal arm 51 and the pivoted frame, said arm having outwardly offset terminal portions 52 (Fig. 3). The bar is secured to the two intermediate fixed vertical channels 33.

A horizontal bracket 53 is secured at the upper end of each vertical channel 45, said bracket having a lower inwardly facing diagonal camming surface 54. In its preferred mode of operation the uppermost cavity, i.e., the cavity between the two uppermost platens, is filled first and to secure the greater spacing between these platens the cradle is moved upwardly one increment. As the platen moves upwardly due to upward travel of the cradle, camming surfaces 54 of brackets 53 engage the reinforcing angles 20 at the ends of the platens and the upper end of the catch arm or platen-supporting frame is cammed outwardly. As soon as the platen passes the upper surface of bracket 53 the catch arms spring back to the platen-supporting position of Fig. 8 and the oil pressure in cylinder 30 is then released allowing the upper platen to be supported on its underside. All of the platens below this uppermost plate are now supported on base frame 21. The increased spacing between the platens may be from ½ to ¾ inch.

As soon as the first cavity is filled with boxes the cradle is raised one increment and the second platen is supported by the catch arms 43. This operation continues until the lowermost cavity is filled, at which time the oil pressure is released in cylinder 30, allowing the cradle and the platens to descend to the floor of the housing.

Figure 9:
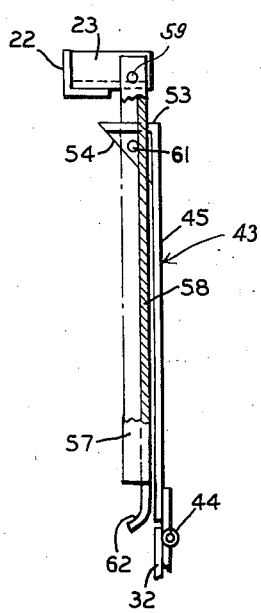
Fig. 9 is a side elevation, partly in section, of the platen separating assembly.
Figure 10:
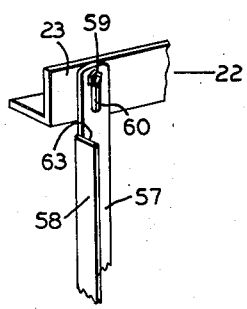
Fig. 10 is a fragmentary view of part of the structure shown in Fig. 9.

The following novel means are employed for holding the catch arms 43 in retracted position during this downward travel of the platens (Figs. 8, 9 and 10). A bar 57 having a right angular flange 58 is secured by a bolt 59 to upper frame 22 at each corner of the cradle and this bar travels up and down with the cradle. This bolt passes through a slot 60 in the angle bar (Fig. 10) to allow for adjustment when boxes of lesser height are to be frozen. During intermittent upward travel of the cradle a pin 61 secured to bracket 53 travels along the inner face of flange 58. The lower end of the flange extends below bar 57 and is curved inwardly as shown at 62. When the lowermost cavity is filled the cradle travels upwardly one further increment and pin 61 contacts curved section 62 and cams the lower end of the bar outwardly, allowing pin 61 to contact the outer face of flange 58. Oil pressure in the cylinder is now released, allowing the cradle to descend. During this downward travel pin 61 holds the upper end of catch arms 43 out of contact with the platens. When the cradle reaches the floor the pin clears the upper end 63 of flange 58, allowing the pin and the catch arm to move inwardly under the influence of springs 50 and again travel along the inner face of flange 58 during the next cycle of upward travel of the cradle.

If the freezer is to have wholly manual operation the operator need only control the passage of fluid under pressure which enters cylinder 30 through conduit 28 and make certain that each time the cradle is raised one increment it is raised sufficiently far so that catch arms 43 can move inwardly to support the next platen. After all the platen areas are filled the cradle is raised one further increment and pins 61 carried on brackets 53 engage the outer face of flange 58, thus holding the catch arms in retracted position during the entire downward travel of the cradle. In other words, in this manual control the cooperation of the catch arms is fully automatic without the need for any further manual manipulation or electrical controls.

If fully automatic operation is adopted, which is preferred, a suitable box conveyor and fully automatic pusher assembly such as is shown in our co-pending applications are a virtual necessity. The controls for the pusher assembly, the conveyor apparatus which makes up the groups of boxes and the control of the freezer platen array are so interdependent that a circuit showing the essential components of all three parts of the automatic organization is shown in Fig. 11. Reference to elements which do not directly concern the freezer per se will be briefly made.

The pusher assembly is actuated by a piston rod 68 extending from a cylinder 35 connected with a suitable source of fluid under pressure. After the packages have been frozen the pusher first makes a break-away stroke to break the bond between the frozen packages and the platen. The pusher bar has four positions, to wit: IL (intermediate limit or starting position); RL (rear limit or position for starting forward box feeding stroke); FL (forward limit during box feeding stroke); and FFL (full forward limit at the end of the break-away stroke).

Conduits to the driving cylinder for the pusher are connected to a reversing valve shown in detail in our Patent No. 2,812,050 and including a cylinder, a valve piston and shafts 75 and 79 rigidly connected thereto and extending from opposite ends of the cylinder and which are controlled by two solenoids 76 and 77. When this valve piston and shafts 75—79 carried thereby move to the right, piston rod 68 in cylinder 35 moves to the left (downwardly when viewed as in Fig. 11) and vice versa.

When current is applied to the forward (For.) solenoid 77 shaft 75 is pulled to the right, thereby aligning two straight vents with three conduits and allowing liquid to move the piston in cylinder 35 to the left (downwardly as in Fig. 11). When current is removed from solenoid 77, the shaft 75 and a valve piston are returned to the "off" position by a spring (not shown) and the movement stops.

The piston in cylinder 35 is moved to the right and the pusher outwardly of the freezer by the actuation of solenoid coil 76 and a movement of shaft 75 to the left.

Control for the pusher and the operation of cylinder 35 is effected by a counting and control circuit shown in schematic form in Fig. 11. The counting control includes a counting relay assembly which comprises a count control winding, an armature, a reset winding, a rack bar 90 driven by a pawl 91 on the armature, a pair of normally open contacts 92 closed each time the armature is actuated, and a plurality of contacts 89 associated with a pre-set dial contact means 99 which will be described later.

The control circuit also includes seven relays. The function of these relays may be generally described as follows: A count relay 127 is operated each time the contacts 92 are closed. This relay operates the forward (For.) solenoid 77 and thereby operates the pusher. A reverse relay 142 is operated by a forward limit switch (FL) and controls the reverse (Rev.) solenoid 76, thereby moving the pusher back to its normal position. An Up relay 151 is operated by the "set count" contact in the pre-set dial array. The Up relay is operated each time a platen is filled with unfrozen boxes and its operation causes the actuation of a solenoid (Up) winding 93 to move an empty platen into the loading plane.

A catch (A) relay 89 is actuated by catch limit switches which are operated when another platen has been raised slightly above its loading position. When the catch relay 89 is actuated it causes the reset winding to be actuated and the release of rack bar 90. A spring 94 draws the rack bar back to its starting position and count control circuit 85 is then in its normal condition, ready to start a new count. A catch (B) relay 99 is also actuated by the catch limit switches, acting through contacts on the Up and catch A relays. When this relay is actuated the Up solenoid is de-energized and the platen to be filled is lowered slightly against stops. The platen is now ready to receive unfrozen boxes.

A platen relay 99 is actuated by platen loading limit (PLL) switches acting through contacts on relay 5. The platen relay causes the pusher arm to go to its full forward limit to break loose the frozen boxes. An overcount relay 109 is actuated only when an overcount has been made by the count circuit 85. When the overcount relay is actuated, all operations stop and an attendant must inspect the control system and reset the count dial before operations can continue.

The control circuit also includes a solenoid 95 which is operated when all the platens have been filled and the platen assembly is in its lowest position, in the act of being frozen. Solenoid 95 (Down) is energized through a lower limit switch 96 (LL–1) and exerts a light pressure on the platen assembly to cause complete contact of platen surfaces and boxes.

The control circuit also includes four switches which are operated by a contact knob 97 on shaft 68. The switches are actuated when the pusher bar is in predetermined positions. When the bar is in its full forward limit (FFL) in the act of breaking loose frozen boxes, switch 98 is actuated. When the bar is in the usual forward limit (FL) after having pushed a row of boxes onto a platen, switch 100 is actuated. When the bar is in its intermediate position (or starting position) (IL) switch 101 is actuated. When the pusher bar is in its rear limit position (RL) switches 102 and 103 are actuated.

When the platen assembly is raised and each platen area is filled, the top platen surface is raised toward the top wall and when the last platen area has been filled, an additional upward motion closes an upper limit switch (UPL) 104 by contact with a rod 105 which is secured to the top platen and extends through a hole in the upper wall of the housing.

A box sensing means is mounted over the endless belt 41 (Fig. 1) to sense a full row of boxes on the belt. This sensing means includes a motor 106 in a flexible housing having a shaft which connects with an overruning clutch 107 (see Fig. 11). The other side of clutch 107 is connected to a soft wheel 108 which is mounted so as to make contact with the top surfaces of the unfrozen boxes 110 (shown in dotted lines) as they are moved into position by the belt 41. During the loading operation motor 106 is running, because its supply circuit is connected through switch 102, and belt 41 is arranged to move the boxes under wheel 108 at a rate which turns the soft wheel faster than the motor is geared to turn it. As long as the boxes move under the wheel, there is no strain put on the motor since the overruning clutch permits the wheel to move faster than the motor shaft. As soon as the group is filled with boxes wheel 108 is restrained in its movement, a strain is put on the motor, and the motor housing 106 is rocked, thereby closing a switch 111 and sending current through winding 86 of the count relay 127 causing its armature to be actuated to move rack bar 90 one contact space. This circuit may be traced from terminal 112, over conductors 113 and 114, through switches 96 and 115, over conductor 116, to switch 111, then through closed contacts 117 on the overcount relay 109, over conductor 118, through contacts 120 of the relay, contacts 121 of the count relay, over conductor 122, to the count control winding 86, and then over conductors 123 and 124, to terminal 125.

When the armature 87 of the count relay is actuated, an insulated portion of the armature 126 closes contacts 92 and causes current to flow through winding 127 of the count relay. This circuit may be traced as before, through contacts 120 of the reverse relay, over conductor 128, through contacts 92, winding 127 and conductor 124. As soon as the count relay is actuated, contacts 121 are broken and the current is cut off from winding 86. However, holding contacts 130 are closed and the count relay is held in its actuated condition by a circuit which can be traced from conductor 124, through winding 127, contacts 130, conductor 131, through the forward limit switch 100, to conductor 113. During this part of the loading operation shaft 68 is positioned so that knob 97 is actuating switches 102 and 103.

A complete cycle of one plate loading operation may be described as follows: With the pusher bar in its rear position and shaft 68 causing the actuation of switches 102 and 103, main switch 132 is moved to "Auto." and the sequence of operations as described above takes place. Prior to moving the switch 132 to start the automatic operation, dial switch 99 is set at a contact point which represents the number of rows of boxes which can be placed on the platen and the rack bar 90 is in its starting position where movable contact 133 makes electrical contact with stationary contact 134.

When the count relay is actuated, contacts 135 are closed and a circuit is completed through the forward solenoid 77. This circuit may be traced from conductor 113, through contacts 135, over conductor 136, through closed contacts 137 of the overcount relay, over conductor 138, to winding 77, and conductor 124. This circuit causes the movement of plunger 75 and presents certain vents to the hydraulic system so that the piston in cylinder 35 is moved to the left (upwardly as in Fig. 11) so that the pusher is moved against the boxes and pushes them onto the platen. When the knob 97 is moved away from switches 102 and 103, the circuit to the motor 106 is broken and the motor stops and contacts 111 are opened. However, boxes still move along the belt and form a second row, ready for the next operation of the pusher.

As the pusher moves the boxes into a cavity between the platens, knob 97 moves to the left (upwardly as in Fig. 11) and closes the intermediate limit switch 101. This switch operation causes no action at this time because one terminal of the switch is connected to normally closed contacts 140 (on the count relay) which are now open. The pusher continues its motion until knob 97 makes contact with the forward limit switch 100, breaking the holding circuit of the count relay (over conductor 131) and normalizing all of its contacts. Contacts 135 are opened and this break cuts off the current from the forward solenoid winding 77 and the motion of the piston in cylinder 35 and the pusher stops. At this time, with the count control relay again in operating condition, no count action occurs because the sensing motor 106 cannot turn (switch 102 being normalized) and the sensing contacts 111 cannot close even though a full row of packages are on the conveyor belt.

When the forward limit switch 100 is actuated, the count relay is normalized and the reverse relay is actuated since a circuit is completed from conductor 113, through switch 100, over conductor 141, to the reverse relay winding 142, and to line conductor 124. As soon as the reverse relay is actuated, a holding circuit is formed which retains the armature in its actuated condition. This holding circuit may be traced from conductor 124, through winding 142, through holding contacts 143, over conductor 144, through switch 102, and to conductor 113. The count relay is now normalized because the holding circuit through switch 100 is broken. The actuation of the reverse relay opens contacts 120 and closes contacts 145 which completes a circuit from conductor 113, through contacts 145 of the reverse relay and contacts 146 of the Up relay, to winding 76 of the reverse solenoid, and conductor 124. This actuates plunger 79 and a valve piston is moved to the left, aligning crossed vents with the hydraulic system and moving piston in cylinder 35 and shaft 68 downwardly, as seen in Fig. 11. This action moves the pusher to the left.

In moving from the forward limit switch 100 to the rear limit switch 102, the knob 97 passes and actuates the intermediate limit switch 101 but no circuit is completed since one terminal of the switch is connected by conductor 147 to contacts 140 on the count relay and moving contact 133 on rack bar 90. Contact 133 has been moved one space to the second contact position therefore this line is open.

When the shaft 68 is moved so that knob 97 actuates switches 102 and 103 the reverse relay is normalized since switch 102 was in series with its holding circuit. At this time the sensing motor is started again because switch 102 sends current over conductor 148, through the motor to conductor 124. The row of boxes on belt 41 is generally completed during the return stroke of the pusher mechanism, hence the wheel 108 will cause the motor 106 to close switch 111 and another counting sequence is started. The cycles of operations are the same as before except that the movable contact 133 in the counting circuit is moved another point to the left.

The above described procedure is repeated many times, each cycle moving one row of packages or boxes from the conveyor belt onto the platen. The number of rows of boxes must be predetermined and set in the dial contact switch arm 99. Then when the required number of cycles has been operated and the platen is full, contact 133 will rest on a stationary contact which is connected to the dial arm as indicated in Fig. 11. Then as the pusher is withdrawn from the platen stroke and the shaft 68 moved to the right, knob 97 operates intermediate switch 101 and this time a circuit is completed which may be traced from conductor 113 to dial switch arm 99, to contact 133, closed contacts 140 on the count relay, over conductor 147, through switch 101, through switch 98, through the second lower limit switch 150, to the winding of the Up relay 151, and conductor 124. This circuit operates the Up relay, opening contacts 146 and breaking the circuit through the reverse solenoid, stopping the reverse movement of the pusher at the intermediate position.

The actuation of the Up relay also closes contacts 152, completing a circuit from conductor 113, through contacts 152, over conductor 153, contacts 154 on the catch B relay, over conductor 155, through manual switch contacts 156, to the winding 93 of the Up solenoid. This solenoid (in conjunction with the Down solenoid) controls a vertical hydraulic piston and cylinder mechanism similar in every respect to the mechanism including cylinder 35 and its reversing valve except the vertical piston is secured to shaft 29 which moves the platen array up and down. The Up and Down solenoids 93 and 95 control a valve similar to the reversing valve.

When the Up solenoid is actuated, the vertical piston moves all the platens up until the catch arms 45 move toward the center of the machine with their upper contact surfaces under the edges of the platen 17. When the two catch arms 45 move under the platen surface they actuate two switches 164 and 165 moving them to the positions shown in Fig. 11. When both switches have been actuated and the circuit which includes the Up solenoid 93 is broken and the hydraulic piston which moved the platen array in an upward direction is disconnected and the plates, together with their supporting cradle, slowly settle until the platens held up by the catches are separated by a small distance from the boxes 110 immediately below the upper catch surface. When this happens the top surface of the upper platen makes contact with the platen limit loading switch 115, closing a circuit through the switch and actuating the platen relay 129. This circuit can be traced from conductor 113 through switch 96, platen loading switch 115, conductor 166 through the closed contacts 167 on the catch B relay 119, then through the winding of the platen relay 129, to conductor 124. This circuit causes the actuation of the platen relay and closes contacts 170 and 171.

When the platen relay is actuated a circuit is completed through contacts 171 which may be traced as follows: From line 113, through closed contacts 171 of the platen relay, over conductor 172, through contacts 137 of the overcount relay 109, over conductor 138, to the For. solenoid 77, and line conductor 124. This circuit actuated the reversing valve and operates a piston to propel the pusher from the intermediate position to the array of frozen food packages on the newly exposed platen to break them loose from the platen surfaces and prepare the platen for the next row of unfrozen boxes.

When the pusher is all the way in after having broken loose the frozen packages the knob 97 on shaft 68 makes contact with the full forward limit switch 98 operating it and breaking one circuit to the Up relay and closing another circuit to the reset coil 88. This action actuates the reset mechanism and releases rack bar 90 so that it is returned to its normal or zero count position by means of a spring. When switch 98 opens the circuit to conductor 173 to switch 150 and normalizes the Up relay the reverse solenoid is actuated because of a circuit which may be traced from conductor 124 through the solenoid winding 76, through closed contacts 146, through closed contacts 145, to the line conductor 113. The pusher returns all the way and operates the rear limit switch 102, breaking the current in conductor 144 and normalizing the reverse relay 142. This action opens contacts 145 on the reverse relay and cuts off the current in the reverse solenoid.

The pusher bar is now all the way out in its starting position; the rack bar 90 is in its zero position with contacts 133 resting against contacts 134 and all the relays have been normalized. This was the condition when the operation was started and the apparatus is now set to go through another full cycle to load the new platen. The above described controlled operation is performed over and over again as each platen is filled. When the last platen is filled the Up solenoid controls the vertical piston to move the platen array upward until a rod 105 secured to the upper portion of the platen frame moves through a hole in the upper wall and operates the upper limit switch 104 causing a circuit to be completed which actuates the catch B relay winding 119, thereby breaking contacts 154 and cutting off the current through the Up solenoid winding 93. The platen array now drifts downwardly the entire distance and all the platens are lowered into a freezing well where they may all be frozen to the required temperature. The catch arms 45 are mechanically held away from the platen edges during this downward travel in the manner earlier described.

The platen array remains in its lowered position until all the boxes are frozen. At this time an operator may start another filling and freezing cycle by manually pressing the start button and starting another complete cycle as described above. However, if the freezing time is accurately known a timing device may be employed to start a new cycle by automatic means. The components of this circuit include a timing motor 176 which runs all the time, an electric clutch 177 secured to the shaft of the timer motor, a timer device which may be a set of reduction gears set to operate a lever 180, and a pair of contacts 181 in series with the start button which are opened when lever 180 is operated. The operation of this circuit is obvious; as soon as the platen array settles to its lowest position a lower limit switch 150 is operated and contact is made which energizes the electric clutch 177. The timer motor 176 then turns the timer mechanism 178 until, after a predetermined length of time lever 180 is operated and the timer contacts 181 are opened.

When the platen array is in its lowest position switch 96 is operated thereby sending current from conductor 113 through switch 96, then over conductor 182 to the Down solenoid 95, and line conductor 124. The Down solenoid opens the valve which causes a slight pressure to be exerted on the platens to hold them in close contact with the food packages and permit a more efficient freezing operation.

While the above described device has been designed primarily for automatic action, means have been provided for hand operation. The main switch 132 may be turned to make contact with the manual contact Man. and certain push buttons can then be operated to give step-by-step operation.

With the pusher in its fully retracted position the knob 97 makes contact with switches 102 and 103 thereby forming a circuit which keeps motor 106 running. Now, if the forward For. button 185 is depressed, a circuit is completed which can be traced from one of the manual conductors 186 through the For. switch contacts, to the For. winding 77 of the forward solenoid, and the other side of the supply line 124. This operates the solenoid core 75 and moves the piston in the reversing valve and moves the pusher in the first part of its cycle to push the boxes into the space between two platens. After the pusher has moved to the position denoted by FL, forward limit, or to FFL, full forward limit, the button is released and the reverse button Rev. 187 is depressed. This button completes a circuit which may be traced from conductor 186, through the contacts under button 187, to the solenoid winding of the Rev. reverse solenoid, and core 79 is operated to move the valve piston and cause the power piston to bring the pusher back to its normal or starting position.

By sucessive operations of the For. and Rev. buttons an entire platen can be loaded. Next the Up manual button 188 is depressed and circuit is broken through contact arm 156 but closed through arm 190. This action completes a circuit which may be traced from a second manual line conductor 191, through the rear limit switch arm 103, to the conductor 192, switch arm 190, solenoid winding 93, and the line conductor 124. This circuit operates only when the pusher is all the way out and the rear limit switch 102, 103 in its operated condition. The Up solenoid core operates a valve similar to the reversing valve and the platen array is slowly moved upward. It is necessary for the operator to listen for the sounds of the catch arms 45 as they snap into position under the platen. As soon as these sounds are heard the Up button 188 is released and the cycles of the pusher can be resumed by alternate depressing of the For. and Rev. buttons 185 and 187.

The manual buttons may be used to test the apparatus prior to starting the automatic operation.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What we claim is:

1. An automatic freezer apparatus comprising, in combination, a housing having a slot-like charging opening in one wall thereof to receive boxes of food to be frozen from a moving conveyor and a discharge opening for the frozen boxes in an opposite wall, a plurality of superimposed freezer platens, a cradle, a power means for moving the cradle vertically to successively position two adjacent platens in line with the openings, and opposed catch arms comprising frames pivoted in the housing and having brackets which underlie and support a platen while the platen thereunder is supported by the lower frame in order to increase the depth of the cavity between said two platens during charging, said brackets having camming surfaces which are successively engaged by the platens during each increment of travel to retract the catch arms, means urging the catch arms into platen-supporting position, and cam means carried by the cradle for retaining the catch arms in such retracted position during the entire downward travel of the platens, said power means controlled by switches responsive to the position of the platens and the cradle.

2. An automatic freezer apparatus comprising, in combination, a housing having a slot-like charging opening in one wall thereof for boxes of food to be frozen and a discharge opening for the frozen boxes in an opposite wall, a plurality of superimposed freezer platens, a cradle comprising upper and lower interconnected frames supporting said platens, power means for raising the cradle to successively position two adjacent platens in line with the openings, and opposed catch arms comprising frames pivoted at the bottom of the housing and having brackets at their upper ends which underlie and support a platen while the platen thereunder is supported by the lower frame in order to increase the depth of the cavity between said two platens, said brackets having lower diagonal camming surfaces which are successively engaged by the platens during each increment of upward travel to retract the catch arms, spring means urging the catch arms into platen-supporting position, and means for retaining the catch arms in such retracted position during the entire downward travel of the platens, said power means controlled by sensing means responsive to the successive upward position of the platens to cause the cradle to descend after each increment of upward travel and support a platen on the catch arms while boxes are fed to a cavity below said platen.

3. An automatic freezer apparatus comprising, in combination, a housing having a slot-like charging opening in one wall thereof to receive boxes of food to be frozen from a moving conveyor and a discharge opening for the frozen boxes in an opposite wall, a plurality of superimposed freezer plates, a cradle, a power means for raising the cradle vertically to successively position two adjacent plates in line with the openings so as to receive a plurality of rows of unfrozen boxes, and opposed catch arms comprising frames pivoted in the housing and having brackets which underlie and support a platen while the platen thereunder is supported by the lower frame in order to increase the depth of the cavity between said two platens during charging, said brackets having camming surfaces which are successively engaged by the platens during each increment of travel to retract the catch arms, means urging the catch arms into platen-supporting position, and cam means carried by the cradle for retaining the catch arms in such retracted position during the entire downward travel of the platens, said power means controlled by switches responsive to the position of the platens and the cradle and including a count relay for successively raising the cradle one increment of travel after each platen has received a predetermined number of rows of boxes.

4. An automatic freezer apparatus comprising, in combination, a housing having a slot-like charging opening in one wall thereof for boxes of food to be frozen and a discharge opening for the frozen boxes in an opposite wall, a plurality of superimposed freezer platens, a cradle comprising upper and lower interconnected frames supporting said platens, power means for raising the cradle an increment of travel to successively position two adjacent platens in line with the openings to receive a predetermined number of rows of unfrozen boxes, and opposed catch arms comprising frames pivoted at the bottom of the housing and having brackets at their upper ends which underlie and support an upper platen while the platen thereunder is supported by the lower frame in order to increase the depth of the cavity between said two platens, said brackets having lower diagonal camming surfaces which are successively engaged by the platens during each increment of upward travel to retract the catch arms, said power means being inactivated after said upper platen raises above the brackets to allow the cradle to descend to platen supporting position, spring means urging the catch arms into platen-supporting position, and means for retaining the catch arms in such retracted position during the entire downward travel of the platens, said power means controlled by switches responsive to successive upward positions of the platens, counting means for indicating that a platen is filled with rows of boxes and ready for upward travel one increment, and means limiting upward travel of the cradle when the platens are all filled.

References Cited in the file of this patent

UNITED STATES PATENTS

| | | |
|---|---|---|
| 1,905,131 | Birdseye | Apr. 25, 1933 |
| 1,924,225 | Yamane | Aug. 29, 1933 |
| 2,283,923 | Hall | May 26, 1942 |
| 2,485,509 | Raye | Oct. 18, 1949 |
| 2,531,210 | Gilson | Nov. 21, 1950 |
| 2,578,829 | Nicholson | Dec. 18, 1951 |
| 2,697,920 | Mackenzie | Dec. 28, 1954 |

FOREIGN PATENTS

| | | |
|---|---|---|
| 80,017 | Norway | Apr. 7, 1952 |